Aug. 21, 1956

D. E. OMLIE 2,759,760

FINISH MOLDINGS AND WEATHER SEALING
DOOR TOP HEADERS FOR AUTOMOBILES

Filed March 22, 1954

INVENTOR

Donald E. Omlie

BY Lancaster, Allwine and Rommel

ATTORNEYS

Aug. 21, 1956
D. E. OMLIE
2,759,760
FINISH MOLDINGS AND WEATHER SEALING
DOOR TOP HEADERS FOR AUTOMOBILES
Filed March 22, 1954
2 Sheets-Sheet 2
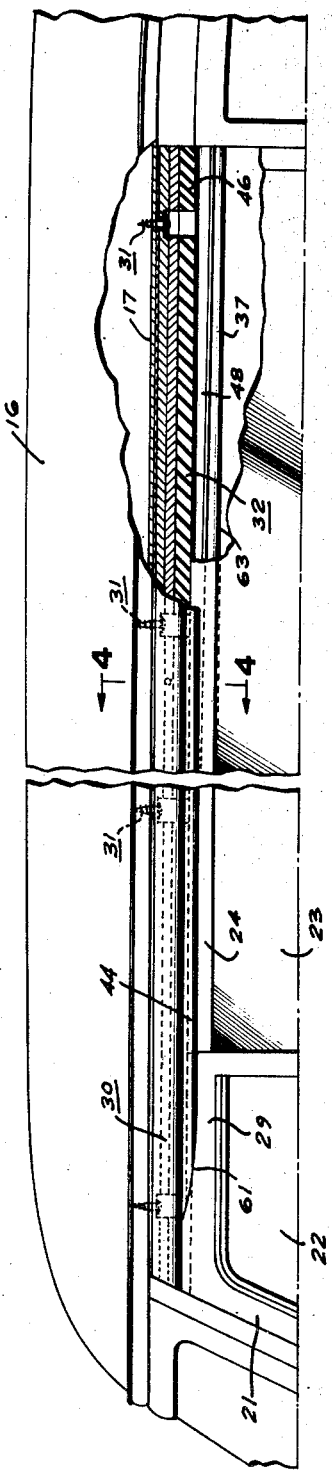
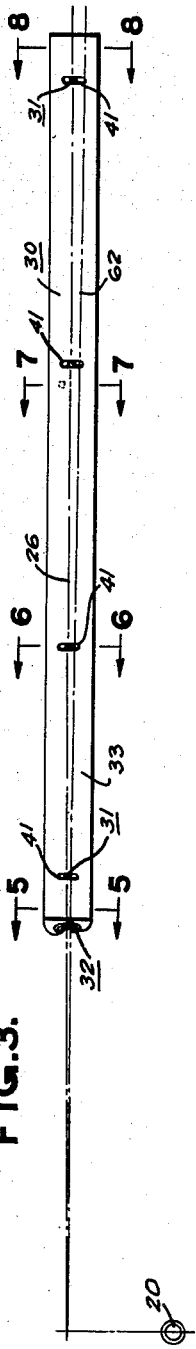
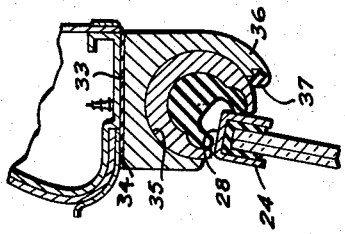
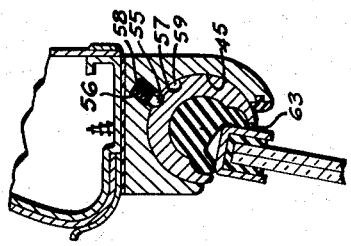
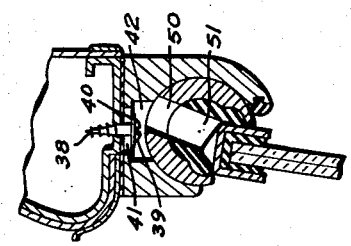
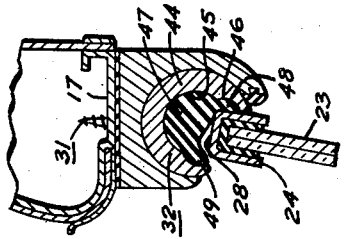
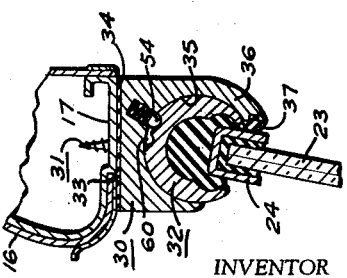
INVENTOR
Donald E. Omlie
BY
ATTORNEYS

United States Patent Office 2,759,760
Patented Aug. 21, 1956

2,759,760

FINISH MOLDINGS AND WEATHER SEALING DOOR TOP HEADERS FOR AUTOMOBILES

Donald E. Omlie, Havre, Mont.

Application March 22, 1954, Serial No. 417,586

10 Claims. (Cl. 296—44)

This invention relates to finish moldings and weather sealing door top headers particularly well adapted for use as parts of hard top and convertible automobiles.

The principal objects of the invention are to provide means applicable to the top frame members of automobiles of the character described, which are inexpensive to manufacture and install, neat in appearance, durable, and effective to prevent the entrance of rain, wind, dust and cold or hot air through the clearance spaces usually provided between the automobile top and the fixed frame at the upper front end of the door of a coupe or the front door of a sedan (provided for the so-called "controlled ventilation" or "no draft" window element), and the vertically sliding door window, having no window header. The invention is also applicable to the rear door of automobiles of the four door type.

Another object is to provide such means requiring no springs for use in actuating, and no hinges for supporting parts of the sealing means, thus eliminating replacement so frequently necessary in other types using springs and/or hinges and where springs become weak or broken and hinges become worn or "frozen." This is mainly accomplished by providing a finish molding which cradles an elongated sealing header capable of oscillating in the finish molding as the door is opened and closed.

Another object is to provide such means which is substantially proof against wind noises or "whistling," as frequently occurs during windy weather or when the automobile is traveling at a high rate of speed, and is equipped with somewhat conventional relatively thin strip material capable of vibrating or flexing and used as flap to support the sealing material engaging the fixed frame and vertically sliding door window hereinbefore referred to.

Another object is to provide a sturdy, elongated weather sealing means of the character described which is uniformally moved to an operative sealing position, as the door is closed, without being subjected to such torsional stresses as are likely to cause the material to become permanently set in a twisted condition if made of the relatively thin strip material of the character hereinbefore referred to and where dependence is placed on the fixed frame at the upper front of the door and some lever or contact member to actuate the weather sealing means to an operative sealing position.

A further object is to provide finish moldings and weather sealing door headers for automobiles of the convertible type which may be folded when the automobile top is folded to render the automobile of the "open" type, and to guard against parts of the finish moldings and headers becoming out of operative alignment when the automobile top is again extended to render the automobile of the "closed" type.

A still further object is to provide finish moldings and weather sealing door headers which may readily be adjusted to function properly even though the hinges of the door become worn as a result of use or the doors are slightly sprung as may result from accident.

Further objects and advantages of the invention will appear in the following detailed description, taken in connection with the accompanying drawings, forming a part of this specification, and in which drawings:

Fig. 2 is an enlarged fragmentary view, partly in side elevation and partly in vertical longitudinal section of the upper portion of the automobile and the present invention applied thereto.

Fig. 3 is a combination view, partly in plan view of the finish molding means according to the present invention, and partly diagrammatic, showing the hinge location of a typical automobile door installation.

Fig. 4 is an enlarged transverse, vertical sectional view on the line 4—4 of Fig. 2, showing the relative position of parts when the door is closed.

Figs. 5, 6, 7 and 8 are views similar to Fig. 4, but taken on the lines 5—5, 6—6, 7—7 and 8—8 of Fig. 3 and showing the relative position of parts just as a part of the open door is engaging a part of the weather sealing means to actuate it to a sealing position as the door is finally closed.

Figure 1:
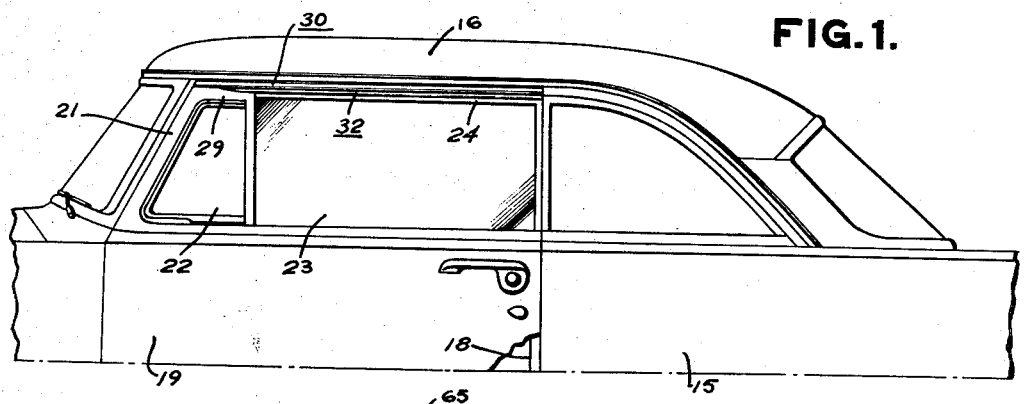
Fig. 1 is a fragmentary side elevational view of an automobile of the hard top type equipped with a combination finish molding and weather sealing top door header constructed according to the present invention.
Figure 9:
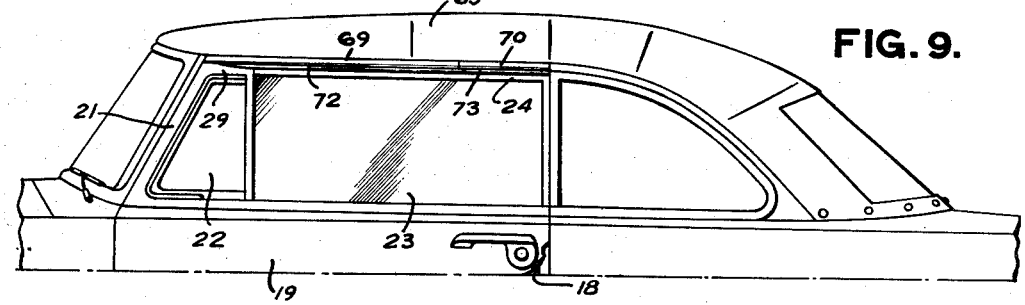

Fig. 9 is a view similar to Fig. 1, but showing the present invention applied to an automobile of the convertible type, that in which the automobile top is of hinged sections that may be folded back to render the automobile of the "open" type.

Figure 10:
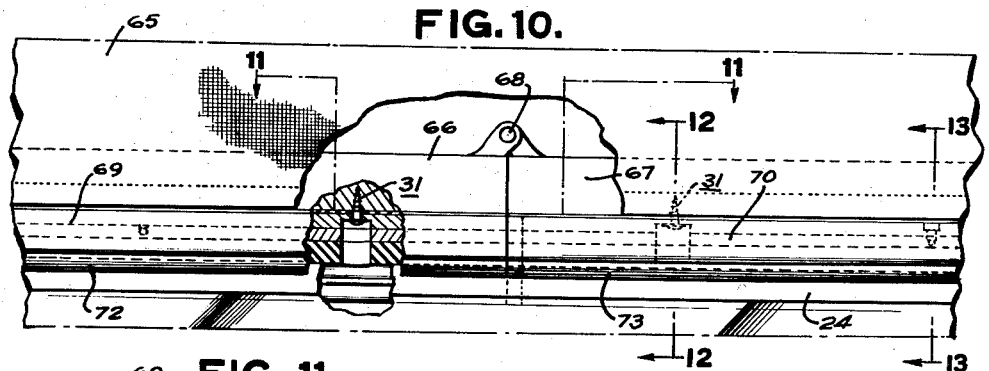

Fig. 10 is an enlarged, fragmentary view, partly in elevation and partly in section showing the present invention applied to sections of the automobile top a portion of which is broken away to show a typical hinge connection of the sections.

Figure 11:
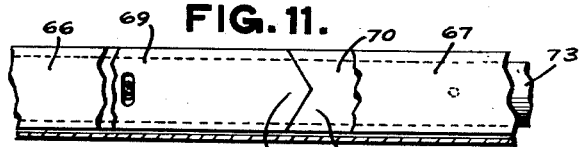

Fig. 11 is a view partly in plan and partly in horizontal section on substantially the line 11—11 of Fig. 10.

Figure 13:
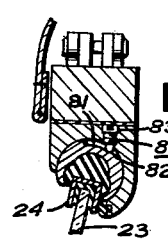
Figures 12, 14:
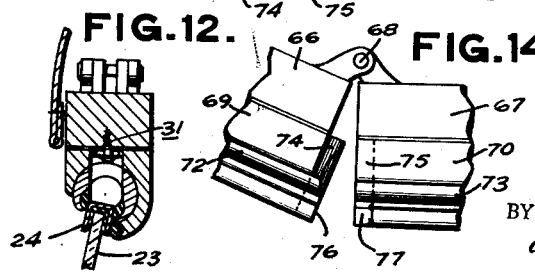

Figs. 12 and 13 are sectional views on the lines 12—12 and 13—13 of Fig. 10.

Fig. 14 is a fragmentary, elevational view of parts of the automobile top at a hinge connecting two sections thereof and in angular relation, as during opening or closing the top, and showing a preferred construction of interlocking portions of the companion molding strips and weather sealing means of the present invention, provided to guard against these parts becoming out of operative alignment when the automobile top is extended to render the automobile of the "closed" type.

In the drawings and referring first to the form of invention disclosed in Figs. 1 to 8 inclusive, there is disclosed especially in Figs. 1, 2 and 3, portions of a contemporary automobile of the hard top type comprising a body 15, a top 16 including a top frame member 17 above a side door opening 18 of the body and a door 19 for the opening, hinged to the body in any suitable manner to swing about a vertical axis 20. The door 19, in the example shown, is of a conventional type, including a fixed frame 21 at its upper front end receiving a so-called "controlled ventilation" minor pivoted window element 22 and a major, vertically sliding window 23, provided with the usual upper frame member 24 along its upper margin, disposed rearwardly adjacent the frame 21. The door 19 carries no window header for the window 23 and in the past the door header formed as an integral part of the top frame member 17 serves as and takes the place of a window header for the vertically opening door window. Also in contemporary automobiles, in order to provide more room for passengers than was provided for them when the automobiles were provided with running boards, and to streamline present day vehicles, the doors are so hinged that each swings about a substantially vertical axis 20, indicated in Fig. 3, offset outwardly and laterally with respect to center line of the top of the door when closed, as indicated by dot-and-dash line 62 in Fig. 3. Thus it is the practice to slant the upper portion of the door 19 inwardly and upwardly from the lower portion, the slant of the window 23, which is a part of the door, being shown in Figs. 4–8. In a typical example this slant is 10° with respect to the vertical and hence the top surface 28 of the window upper frame member 24 is also at an angle to the horizontal, slanting inwardly and downwardly as shown in Figs. 4–8.

Considering now the present invention as applied to an automobile of the hard top type, it comprises generally a finish molding 30, secured as by means 31 to the top frame member 17 longitudinally of the door opening 18 and an elongated weather sealing header 32 carried by extending longitudinally of and having oscillatory movement with respect to the finish molding 30. This weather sealing header cooperates with the upper portion of the door, which in this instance comprises an upper frame member 29 of fixed frame 21, and the upper frame member 24 of vertically sliding window 23, to exclude rain, wind, dust and cold or hot air from entering the passenger compartment of the automobile at the upper portion of the door, when the vertically sliding window 23 is in a closed position. The upper portion of the door, without the adition of any levers or separate contact elements or strikes brings about the required oscillatory movement of the weather sealing header 32 with respect to the finish molding 30.

In the example shown, the finish molding 30 may be an elongated rigid member, such as extruded base metal, plated to give the desired finish, or aluminum polished to present a fine finish, and shaped to provide an upper flat surface 33 for surface-to-surface engagement with the frame member 17, or with an interposed packing strip 34 shown in Fig. 4, and a downwardly opening, longitudinally extending recess 35 of arcuate cross section, greater than a semi-circle. It is also preferably provided with an inwardly located, downwardly and longitudinally located stop flange 36 for engagement with the inner surface of the door 19. This flange 36 may be provided with a yieldable seating strip 37, such as of rubber engaged by the inner faces of frame members 24 and 29, the former of which is shown in such engagement, in Fig. 4. This seating strip absorbs shock, when the door is slammed shut and is not intended as a weathertight medium.

In the example shown, the means 31 for securing the finish molding 30 to the top frame member 17 comprises a plurality of screws, each including a shank 38 and a head 39, and preferably a washer 40 for each screw. In order that the position of the finish molding may be adjusted with respect to the top frame member to properly locate the weather sealing header for operation and efficient sealing relationship with the upper portion of the door, the finish molding is provided in its upper portion with an elongated, transversally extending slot 41 for the shank 38 of each screw, as shown in Fig. 3, and a recess 42 beneath each slot for accommodation of the head 39 and washer 40 of each screw, as shown in Fig. 6. The shank 38 may be of the self threading type extending through the packing strip 34 and in threaded engagement with the top frame member 17. The recess 42 also shown in Fig. 6 communicates with the recess 35, this recess 42 permitting the use of a screw driver, not shown in the drawing, for driving, loosening and tightening of the screw.

Referring now to the weather sealing header 32, it preferably includes an elongated body portion 44 of arcuate cross section, greater than a semi-circle providing a longitudinally extending recess 45 open to its bottom and in assembly this body portion 44 is cradled in the recess 35 of the finish molding 30 with proper tolerance between the parts, so that the header, as a whole, may freely oscillate in the finish molding as the door is opened and closed. The header 32 also preferably includes a downwardly facing sealing strip 46 of yieldable material such as rubber, accommodated in the recess 45 of the body portion 44. This strip 46 may be of inverted channel formation and made of molded sponge rubber with the usual surface skin of the character shown in the patent to Hood, 1,763,522 of June 10, 1930, whereby the sealing strip has a body portion 47 against which the top surface 28 of window upper frame member 24 engages when the door is closed, and the window 23 is "up;" and depending inner and outer legs or flanges 48 and 49, respectively to engage, with intimate contact, the iner and outer faces of the frame member 24.

In order that access may be had to the screw heads 39 through the weather sealing header to the recesses 42 in the finish molding, the body portion 44 and the sealing strip are provided with holes 50 and 51, respectively at the zone of each recess 42 located so as to communicate therewith especially when the door is closed, for when the window 23 is in an "up" position the holes 51 are sealed off by the upper frame member 24.

When installing the finish molding 30, with its weather sealing header 32 in place, the former is secured in its approximate location beneath the top frame member 17, with the fastening means 31 sufficiently loose that the molding finish may be adjusted by hand either in an inward or outward direction. The door is then closed, with the window 23 in an up position, followed by an adjustment of the molding and header to a position where the seating strip 37 engages the inside upper portion of the door, throughout the length of strip 37. Upon lowering the window 23 access may be had through the holes 50 and 51 so that a screw driver or other tool may be used to tighten means 31 against displacement even though the strip 37 or the flange 36 is subjected to the shock of a door when slammed shut. The means 31 above the frame 21 may be tightened after the door is opened.

Fig. 4 shows the relative position of the parts when the door is closed and the window is in an "up" position. Fig. 5 shows the relative position of the parts when the door is slightly ajar, such as at a position just before it is in a fully closed position. There the frame 24 is engaging the flange 48 of the sealing strip 46 and is about to turn the header 32 in a counterclockwise position, to that shown in Fig. 4 when the door is closed. During this counterclockwise turning of the header 32 the strip 46 is slightly compressed and in the final closed position engages, with intimate contact, the top, and inner and outer sides of the frame 24. When opening the door, the frame 24 acting on the flange 49 turns the header 32 in a clockwise direction until the uppermost edge of surface 28 clears beneath the outside lower edge of the header. It will be noted that if for some reason the header, while the door is open, moves slightly counterclockwise, the inclined upper surface 28 will, while the door is being closed, move the header clockwise, so as to clear it and subsequently move the header counterclockwise to the sealing position.

However, I prefer to provide means 54 associated with the molding 30 and header 32 to restrain free oscillatory movement of the header with respect to the molding, incident to vibration and the force of gravity. This means may comprise a ball 55, biased by an expansion spring 56 into engagement with the bottom of an arcuate groove 57 extending transversally of the body 46 and open to its upper surface, the spring 56 being accommodated in a socket 58 in the molding, open to the recess 35 thereof. If desired, the groove 57 may be provided with slight depressions 59 and 60 at its ends located in such manner that the ball 55 will seat in depression 59 when the header 32 is in sealing relation with the door, and in depression 60 when the header 32 is in a position to amply clear the door when open.

If the door is opened or closed while the window 23 is in a "down" position, the frame portion 29 will actuate the header 32 in the same manner as the upper portion of window 23.

Although the means 54 will function to prevent accidental displacement of the header from its various operative positions attained by the opening and closing of the door, I prefer to taper, as at 61, the forward outer lower edge of the body portion 44, as shown in Fig. 2. Thus if, while the door is open, the header is turned to a position as shown in Fig. 4, such as by manual operation, the door is moved toward a closed position, the frame 21, and particularly the upper frame member 29 thereof will cause a scissoring action with respect to the header, sufficient to move it to a position such as is shown in Fig. 5 in order to accept the top of the door.

Since the center line 26 of the top of the closed door is a considerable distance from the pivotal axis 20 of the door, as shown in Fig. 3, it will be noticed that when the door is ajar, this center line, shown by dot-and-dash line 62, diverges with respect to the center line 26. An important feature of the preferred construction of the present invention is to guard against subjecting the body portion 44 and the sealing strip 46 to destructive torsional stresses during the opening and closing of the door. This is preferably accomplished by tapering the inner margin 63 of the recess 45 of body portion 44, and the margin of flange 48 of the sealing strip 46, from back to front so that they parallel the dot-and-dash line 62 shown in Fig. 3, and as may be determined by the showing in Figs. 5-8. Thus the header has movement imparted to it in the final closing of the door by engagement of its top marginal portion of the door throughout the length of these tapered margins of the header.

In Figs. 9-14, the invention is illustrated as applied to a convertible automobile in which the parts are substantially the same as in Figs. 1-8, with the exception that the automobile has a flexible top 65 supported by a frame including two top frame sections 66 and 67 normally extending in aligned relationship over the door opening 18. These sections are connected by a hinge 68 whereby they may be swung about an axis crosswise and above the door opening in the usual manner for folding of the top 65 and converting the automobile into one of the "open" type. This necessitates dividing the finish molding into two normally end-to-end sections 69 and 70, and the weather sealing header into two normally end-to-end sections 72 and 73, the sections 69 and 72 being companion molding and header sections, and the sections 70 and 73 similar companion sections. The frame section 66 has secured to it, the molding section 69 by means 31 and likewise the frame section 67 has secured to it the molding section 70 by means 31 hereinbefore described.

To facilitate bodily adjustment of the companion sections 69 and 70, when installing the molding in proper relationship to the upper marginal portion of the door, by use of the means 31, I provide these sections with interfitting end portions 74 and 75, preferably of V-formation, as shown in Fig. 11.

In order that the sections 72 and 73 will oscillate in unison when the door is opened and closed, even though the vertically sliding window 23 is in a "down" position and the fixed frame 21 of the door alone actuates the header section 72 I provide the sections 72 and 73 with interengaging end portions 76 and 77 also preferably of V-formation.

While the means 54 hereinbefore described to restrain free oscillatory movement of the header with respect to the finish molding also normally functions to prevent relative longitudinal movement, one with respect to the other, I prefer to provide a more positive means 80 for this purpose. This may be accomplished by providing an arcuate transverse groove 81 in the header section open to its upper portion, as shown in Fig. 13, into which extends the terminal portion 82 of a screw 83 carried by the molding section. This means 80 is particularly desirable where the device is applied to a convertible type of automobile since the tops thereof are frequently folded and extended and in so doing a person may grasp the attachment in such manner as to otherwise move the header section longitudinally of the companion molding section, or a mischievous person might attempt to do so when the top is folded.

It is believed the function and operation of the various parts making up the moldings and headers of these two forms of the invention will be readily understood from the foregoing description which are to be considered as preferred forms, although they may be changed as to details or mechanical equivalents substituted, without departing from the spirit of the invention as set forth in the following claims.

I claim:

1. In combination with an automobile of the type including a body, a top frame above a side door opening in the body, and a door for said opening, hinged to the body at the front side of the door opening to swing outwardly about a substantially vertical axis off-set laterally in an outward direction with respect to the longitudinal center line of the top marginal portion of the door when closed; a finish molding, means securing said molding to said top frame member longitudinally of the top of said door opening, and an elongated weather sealing header carried by, extending longitudinally of and having oscillatory movement with respect to said finish molding, said header comprising an elongated body portion provided with a longitudinally extending recess open at its bottom, and a yieldable sealing strip in said recess with which the top portion of the door has weathertight engagement when the door is swung to a closed position, the inner margin of said recess, being tapered from the back to front so as to engage the top marginal portion of the door, when the door is ajar, whereby the header has movement imparted to it during final closing of the door by engagement of said top marginal portion with said tapered margin throughout its length.

2. The combination as specified in claim 1 in which said yieldable sealing strip is of inverted channel shape providing a groove in which the upper marginal portion of the door engages and the inner margin of said groove is substantially parallel to said inner tapered margin of said recess.

3. In combination with an automobile of the convertible type including a body, top frame sections provided with a hinge connecting them to swing about an axis crosswise and above a door opening of the body, and a door for said opening hinged to the body to swing about a substantially vertical axis, the door having a vertically movable headless window which, when in an "up" position, substantially closes the space between the closed door and said top frame sections; a finish molding comprising two normally aligned end-to-end sections carried one by each of said top frame sections, and separable at the zone of said hinge, and an elongated weather sealing header comprising two normally aligned, end-to-end sections carried one by each of said molding sections, and extending longitudinally thereof, said header sections separable at the zone of said hinge and having oscillatory movement with respect to said finish molding sections, said header sections each including a downwardly facing yieldable sealing strip which the upper portion of said window engages in a weathertight relationship when the door is closed and the window is in said "up" position and through which engagement the header is oscillated, as the door is opened and closed while the window is in said "up" position.

4. The combination as specified in claim 3 in which said sections of the weather sealing header at the zone of the hinge have interengaging end portions to cause them to rotate and oscillate in unison.

5. The combination as specified in claim 3 in which said finish molding sections are each provided with a downwardly opening, longitudinally extending recess of arcuate cross section, said weather sealing header sections includes a body portion of arcuate cross section, fitting into said recess of its companion finish molding section to provide for the oscillating movement specified, and means is provided to restrain the companion finish molding and weather sealing header sections from movement one with respect to the other in a longitudinal direction.

6. In combination with an automobile of the type including a body, a top frame member above a door opening in the body, and a door for said opening hinged to the body to swing about a substantially vertical axis; a finish molding provided with a downwardly-opening longitudinally-extending recess of arcuate cross section, means securing said finish molding to said top frame member longitudinally of the top of said door opening, and an elongated weather sealing header carried by, extending longitudinally of and having oscillatory movement with respect to said finish molding, said weather sealing header including an elongated body portion of arcuate cross section fitting into said recess for oscillatory movement with respect to said finish molding, and a downwardly facing yieldable sealing strip carried by said body portion which sealing strip the upper portion of the door engages in a weathertight relationship when the door is closed, and through which engagement the header is oscillated, as the door is opened and closed.

7. In combination with an automobile of the type including a body, a top frame member above a door opening in the body, and a door for said opening hinged to the body to swing about a substantially vertical axis; a finish molding provided with a downwardly-opening longitudinally-extending recess of arcuate cross section, means securing said finish molding to said top frame member longitudinally of the top of said door opening, and an elongated weather sealing header carried by, extending longitudinally of and having oscillatory movement with respect to said finish molding, said weather sealing header including an elongated body portion of arcuate cross section fitting into said recess for oscillatory movement with respect to said finish molding and a downwardly facing yieldable sealing strip carried by said body portion which sealing strip the upper portion of the door engages in a weathertight relationship when the door is closed, and through which engagement the header is oscillated, as the door is opened and closed, said recess being greater in arcuate cross section than a semi-circle, whereby the weather sealing header is retained against falling from the finish molding.

8. In combination with an automobile of the type including a body, a top frame member above a door opening in the body, and a door for said opening hinged to the body to swing about a substantially vertical axis; a finish molding provided with a downwardly-opening longitudinally-extending recess of arcuate cross section and also provided with an elongate transversely-extending slot and a second recess beneath and in communication with said slot, means securing said finish molding to said top frame member longitudinally of the top of said door opening comprising a screw, having a shank and a head, with said shank in screw threaded engagement with said top frame member and accommodated in said slot and said head engaging in said second recess, and an elongated weather sealing header carried by, extending longitudinally of and having oscillatory movement with respect to said finish molding, said weather sealing header including a downwardly facing yieldable sealing strip which sealing strip the upper portion of the door engages in a weathertight relationship when the door is closed, and through which engagement the header is oscillated, as the door is opened and closed, said weather sealing header being provided with a transverse opening communicating with said second recess through which opening access may be had to said screw head for selectively tightening or loosening said screw during adjustment of said finish molding with respect to the top frame member.

9. In combination with an automobile of the type including a body, a top frame member above a door opening in the body, and a door for said opening hinged to the body to swing about a substantially vertical axis; a finish molding, means securing said finish molding to said top frame member longitudinally of the top of said door opening, and an elongated weather sealing header carried by, extending longitudinally of and have oscillatory movement with respect to said finish molding, said weather sealing header including a downwardly facing yieldable sealing strip provided with a downwardly-opening, longitudinally-extending groove into which the upper portion of the door extends when the door is closed and which sealing strip the upper portion of the door engages in a weather-tight relationship when the door is closed, and through which engagement the header is oscillated, as the door is opened and closed.

10. In combination with an automobile of the type including a body, a top frame member above a door opening in the body, and a door for said opening hinged to the body to swing about a substantially vertical axis; a finish molding having a socket, means securing said finish molding to said top frame member longitudinally of the top of said door opening, an elongated weather sealing header carried by, extending longitudinally of and having oscillatory movement with respect to said finish molding, said weather sealing header including a transversely-extending groove and a downwardly facing yieldable sealing strip which sealing strip the upper portion of the door engages in a weathertight relationship when the door is closed, and through which engagement the header is oscillated, as the door is opened and closed, and spring actuated means, associated with said finish molding and weather sealing header, frictionally restraining free oscillatory movement of said weather sealing header with respect to said finish molding incident to vibration and the force of gravity, said spring actuated means comprising an expansion spring disposed in said socket of said finish molding and a ball member biased by said spring against said groove in said weather sealing header.

References Cited in the file of this patent

UNITED STATES PATENTS

| | | |
|---|---|---|
| 1,536,842 | Halbert | May 5, 1925 |
| 2,565,393 | Oswald | Aug. 21, 1951 |
| 2,617,161 | Oswald | Nov. 11, 1952 |
| 2,631,887 | Wernig | Mar. 17, 1953 |
| 2,649,329 | Bratton et al. | Aug. 18, 1953 |

FOREIGN PATENTS

| | | |
|---|---|---|
| 15,006 | Great Britain | July 15, 1908 |